(12) United States Patent
Ingalls et al.

(10) Patent No.: US 11,467,961 B2
(45) Date of Patent: *Oct. 11, 2022

(54) DATA CACHE WITH HYBRID WRITEBACK AND WRITETHROUGH

(71) Applicant: SiFive, Inc., San Mateo, CA (US)

(72) Inventors: John Ingalls, Sunnyvale, CA (US); Wesley Waylon Terpstra, San Mateo, CA (US); Henry Cook, Berkeley, CA (US)

(73) Assignee: SiFive, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/332,286

(22) Filed: May 27, 2021

(65) Prior Publication Data

US 2021/0286724 A1 Sep. 16, 2021

Related U.S. Application Data

(63) Continuation of application No. 16/797,478, filed on Feb. 21, 2020, now Pat. No. 11,023,375.

(51) Int. Cl.
  *G06F 12/08* (2016.01)
  *G06F 12/0804* (2016.01)
  *G06F 12/128* (2016.01)

(52) U.S. Cl.
  CPC ........ *G06F 12/0804* (2013.01); *G06F 12/128* (2013.01); *G06F 2212/1008* (2013.01)

(58) Field of Classification Search
  CPC .................................................. G06F 12/0804

USPC ......................................................... 711/122
See application file for complete search history.

(56) References Cited

U.S. PATENT DOCUMENTS

| 5,355,467 A | 10/1994 | MacWilliams et al. |
| 7,570,760 B1 * | 8/2009 | Olson ................... H04L 9/0637 380/37 |
| 2013/0254488 A1 | 9/2013 | Kaxiras et al. |

OTHER PUBLICATIONS

International Search Report for PCT Application PCT/US2021/017934, dated Jun. 15, 2021. 3 pages.

* cited by examiner

*Primary Examiner* — Jae U Yu
(74) *Attorney, Agent, or Firm* — Young Basile Hanlon & MacFarlane, P.C.

(57) ABSTRACT

Described is a data cache implementing hybrid writebacks and writethroughs. A processing system includes a memory, a memory controller, and a processor. The processor includes a data cache including cache lines, a write buffer, and a store queue. The store queue writes data to a hit cache line and an allocated entry in the write buffer when the hit cache line is initially in at least a shared coherence state, resulting in the hit cache line being in a shared coherence state with data and the allocated entry being in a modified coherence state with data. The write buffer requests and the memory controller upgrades the hit cache line to a modified coherence state with data based on tracked coherence states. The write buffer retires the data upon upgrade. The data cache writebacks the data to memory for a defined event.

20 Claims, 7 Drawing Sheets

DATA CACHE WITH HYBRID WRITEBACK AND WRITETHROUGH

CROSS REFERENCE TO RELATED APPLICATION

This application is a continuation of U.S. patent application Ser. No. 16/797,478, filed on Feb. 21, 2020, the entire content of which is incorporated by reference.

TECHNICAL FIELD

This disclosure relates to data caches and in particular, data caches implementing hybrid writebacks and writethroughs when the data cache is in a shared or an exclusive coherence state.

BACKGROUND

Data caches are hardware and/or software components that store data so that future requests for that data can be served faster. Typically, the data caches are either a writeback or a writethrough data cache type, where the data cache type control when the data stored in the data cache is written to a backing store, memory, or the like. A writeback write policy delays writes to the backing store until modified content in the data cache is about to be replaced by another cache block or based on other policies. A writethrough write policy writes to the backing store synchronously when writing to the data cache.

Data caches in a shared memory multiprocessor system typically operate subject to cache coherence protocols and coherence mechanisms, which ensure that changes in the values of shared data are propagated throughout the shared memory multiprocessor system in a timely fashion. Two common cache coherence protocols are, for example, the Modified, Exclusive, Shared, Invalid (MESI) protocol and the Modified, Shared, Invalid (MSI) protocol. In implementations, the exclusive coherence protocol state may be referred to as a unique coherence protocol state. Typically, in the modified coherence protocol state, a cache line is present only in the current cache and is dirty. That is, the data in the cache line is different from the data in the backing store. In this instance, the data cache is required to write the data back to backing store at some time in the future, before permitting any other read of the (no longer valid) backing store. Upon performance of the writeback, the cache line changes to the shared coherence protocol state. In the exclusive coherence protocol state, the cache line is present only in the current data cache and is clean. That is, the data in the cache line matches the data in the backing store. The cache line may be changed to the shared coherence protocol state at any time, in response to a read request. Alternatively, the cache line may be changed to a modified coherence protocol state when writing to the cache line. In the shared coherence protocol state, the cache line may be stored in other caches of the system and is clean. That is, the data in the cache line matches the data in the backing store. The cache line may be discarded (changed to the invalid coherence protocol state) at any time. In the invalid coherence protocol state, the cache line is invalid (unused).

In a writeback data cache, a store (or many stores) may be issued to a cache line(s) or cache block(s) in a "clean" (invalid, shared, or exclusive) coherence protocol state, which is classically defined to have read-only permissions. A write may only be performed freely if the cache line is established or upgraded to the modified coherence protocol state. Cache lines in the exclusive coherence protocol state also have to be upgraded to the modified coherence protocol state to be globally visible.

Coherence protocol upgrades can be done using coherent mechanisms such as snooping, where each data cache monitors address lines for accesses to memory locations that they have cached, or directory, where a backing controller remembers which cache(s) have which coherence permission(s) on which cache block(s). This coherence protocol upgrade process takes time in an interconnect network to probe snoop downgrade other caches, leading to delayed store instruction retirement and reduced performance.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
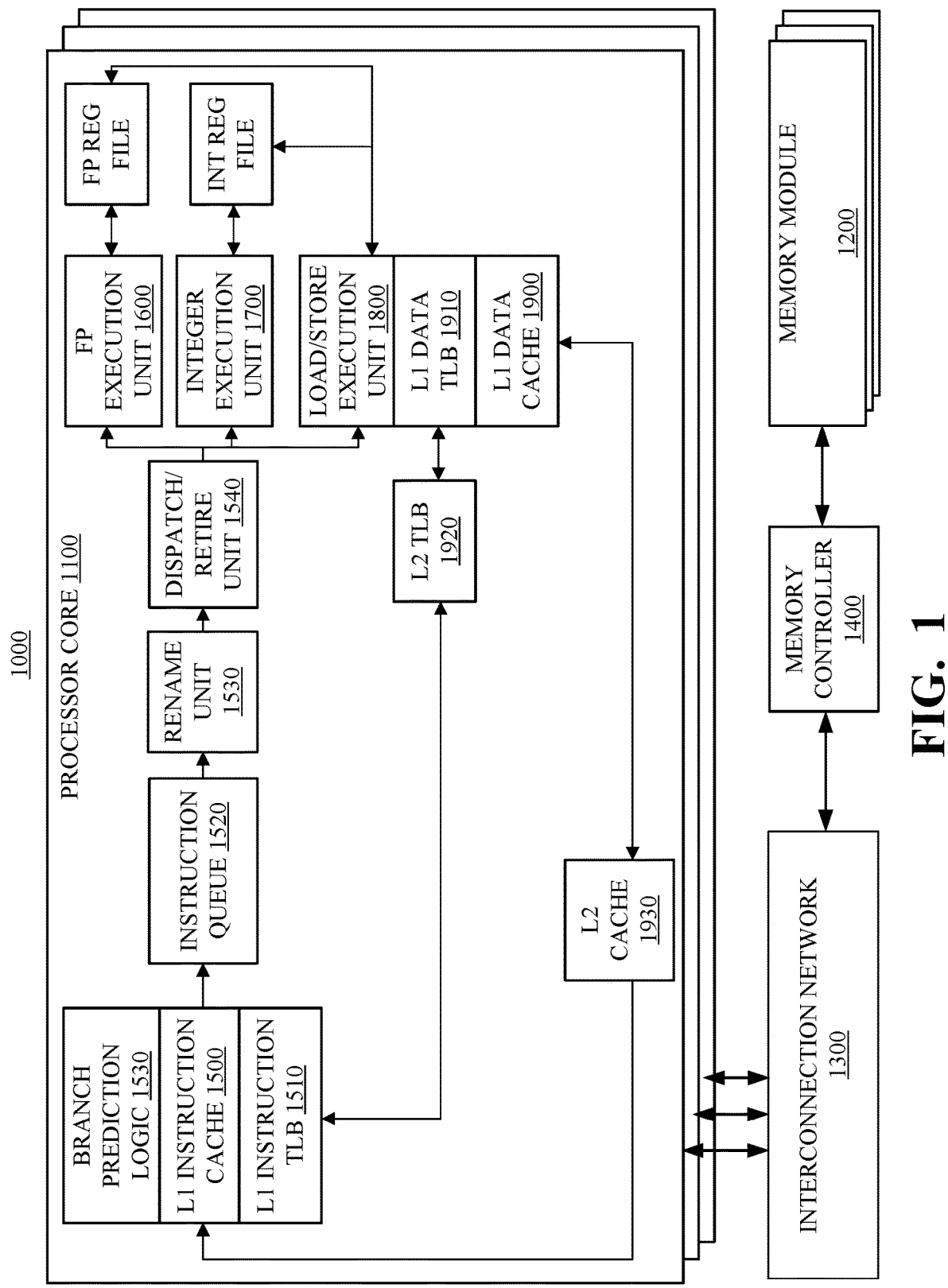
FIG. 1 is a high-level block diagram of an example of a processing system for implementing hybrid writebacks and writethroughs in accordance with embodiments of this disclosure.

Disclosed herein are systems and methods for a hybrid writeback and writethrough data cache. A multiprocessor processing system can include multiple processors and a shared memory. Each of processors can have data caches including a L1 data cache. The L1 data cache can be a hybrid writeback and writethrough data cache which can mitigate the latency associated with performing coherence protocol upgrades and still adhere to the policies of cache coherence protocols.

A processor includes a hybrid writeback and writethrough data cache, a write buffer which tracks the hybrid writeback and writethrough data cache, and a store queue. A store queue writes data to a hit cache line in a hybrid writeback and writethrough data cache and allocates an entry in the write buffer to write the data even if the cache line in the hybrid writeback and writethrough data cache is in a shared or exclusive coherence state. This results in the hit cache line being in a shared coherence state with data and the allocated entry in the write buffer being in a modified coherence state with data. The write buffer messages a memory controller to upgrade the hit cache line to a modified coherence state with data and the memory controller messages the hybrid writeback and writethrough data cache accordingly. The write buffer retires the data and the hybrid writeback and writethrough data cache writebacks the data to memory for a defined event. The write buffer can writethrough the updated data or dirty data if a probe is received by the processor prior to upgrade or writeback. For example, if the hit cache line in the hybrid writeback and writethrough data cache is snoop probed to a shared or invalid coherence state, then the write buffer writethroughs the updated data or dirty data.

The updated data in the hit cache line in the hybrid writeback and writethrough data cache will be readable by loads from a local processor hart, where a hart is a resource abstraction representing an independently advancing execution context within an execution environment. In other words, a hart is a resource within an execution environment that has state and advances along executing an instruction stream independently of other software inside the same execution environment. The updated data is not readable by snoop probes. Alternatively stated, the updated data is not readable by non-local entities which can include, for example, non-local processors, non-local cache controllers, non-local cores, and the like.

Use of the hybrid writeback and writethrough data cache has the effect of extending the memory consistency ordering model's allowed local store buffer into the actual contents of the data cache, which can then be made globally visible whenever the data cache is updated to the modified coherence state. The techniques implemented for the hybrid writeback and writethrough data cache are applicable to the Weak Memory Order (WMO) model in RISC-V and ARM processors and to the Total Store Order (TSO) model in x86 processors.

These and other aspects of the present disclosure are disclosed in the following detailed description, the appended claims, and the accompanying figures.

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

The term "circuit" refers to an arrangement of electronic components (e.g., transistors, resistors, capacitors, and/or inductors) that is structured to implement one or more functions. For example, a circuit may include one or more transistors interconnected to form logic gates that collectively implement a logical function. For example, the processor can be a circuit.

As used herein, the terminology "determine" and "identify," or any variations thereof, includes selecting, ascertaining, computing, looking up, receiving, determining, establishing, obtaining, or otherwise identifying or determining in any manner whatsoever using one or more of the devices and methods shown and described herein.

As used herein, the terminology "example," "embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is, unless specified otherwise, or clear from context, "X includes A or B" is intended to indicate any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

It is to be understood that the figures and descriptions of embodiments have been simplified to illustrate elements that are relevant for a clear understanding, while eliminating, for the purpose of clarity, many other elements found in typical processors. Those of ordinary skill in the art may recognize that other elements and/or steps are desirable and/or required in implementing the present disclosure. However, because such elements and steps do not facilitate a better understanding of the present disclosure, a discussion of such elements and steps is not provided herein.

FIG. 1 is a high-level block diagram of an example of a processing system 1000 for implementing hybrid writebacks and writethroughs in accordance with embodiments of this disclosure. The processing system 1000 can implement a pipelined architecture. The processing system 1000 can be configured to decode and execute instructions of an instruction set architecture (ISA) (e.g., a RISC-V instruction set). The instructions can execute speculatively and out-of-order in the processing system 1000. The processing system 1000 can be a compute device, a microprocessor, a microcontroller, or an IP core. The processing system 1000 can be implemented as an integrated circuit.

The processing system 1000 includes at least one processor core 1100. The processor core 1100 can be implemented using one or more central processing unit (CPUs). Each processor core 1100 can be connected to one or more memory modules 1200 via an interconnection network 1300 and a memory controller 1400. The one or more memory modules 1200 can be referred to as external memory, main memory, backing store, coherent memory, or backing structure (collectively "backing structure").

Each processor core 1100 can include a L1 instruction cache 1500 which is associated with a L1 translation lookaside buffer (TLB) 1510 for virtual-to-physical address translation. An instruction queue 1520 buffers up instructions fetched from the L1 instruction cache 1500 based on branch prediction 1530 and other fetch pipeline processing. Dequeued instructions are renamed in a rename unit 1530 to avoid false data dependencies and then dispatched by a dispatch/retire unit 1540 to appropriate backend execution units, including for example, a floating point execution unit 1600, an integer execution unit 1700, and a load/store execution unit 1800. The floating point execution unit 1600 can be allocated physical register files, FP register files 1610, and the integer execution unit 1700 can be allocated physical register files, INT register files 1710. The FP register files 1610 and the INT register files 1710 are also connected to the load/store execution unit 1800, which can access a L1 data cache 1900 via a L1 data TLB 1910, which is connected tied to a L2 TLB 1920 which in turn is connected to the L1 instruction TLB 1510. The L1 data cache 1900 is connected to a L2 cache 1930, which is connected to the L1 instruction cache 1500.

The processing system 1000 and each element or component in the processing system 1000 is illustrative and can include additional, fewer or different devices, entities, element, components, and the like which can be similarly or differently architected without departing from the scope of the specification and claims herein. Moreover, the illustrated devices, entities, element, and components can perform other functions without departing from the scope of the specification and claims herein.

Figure 2:
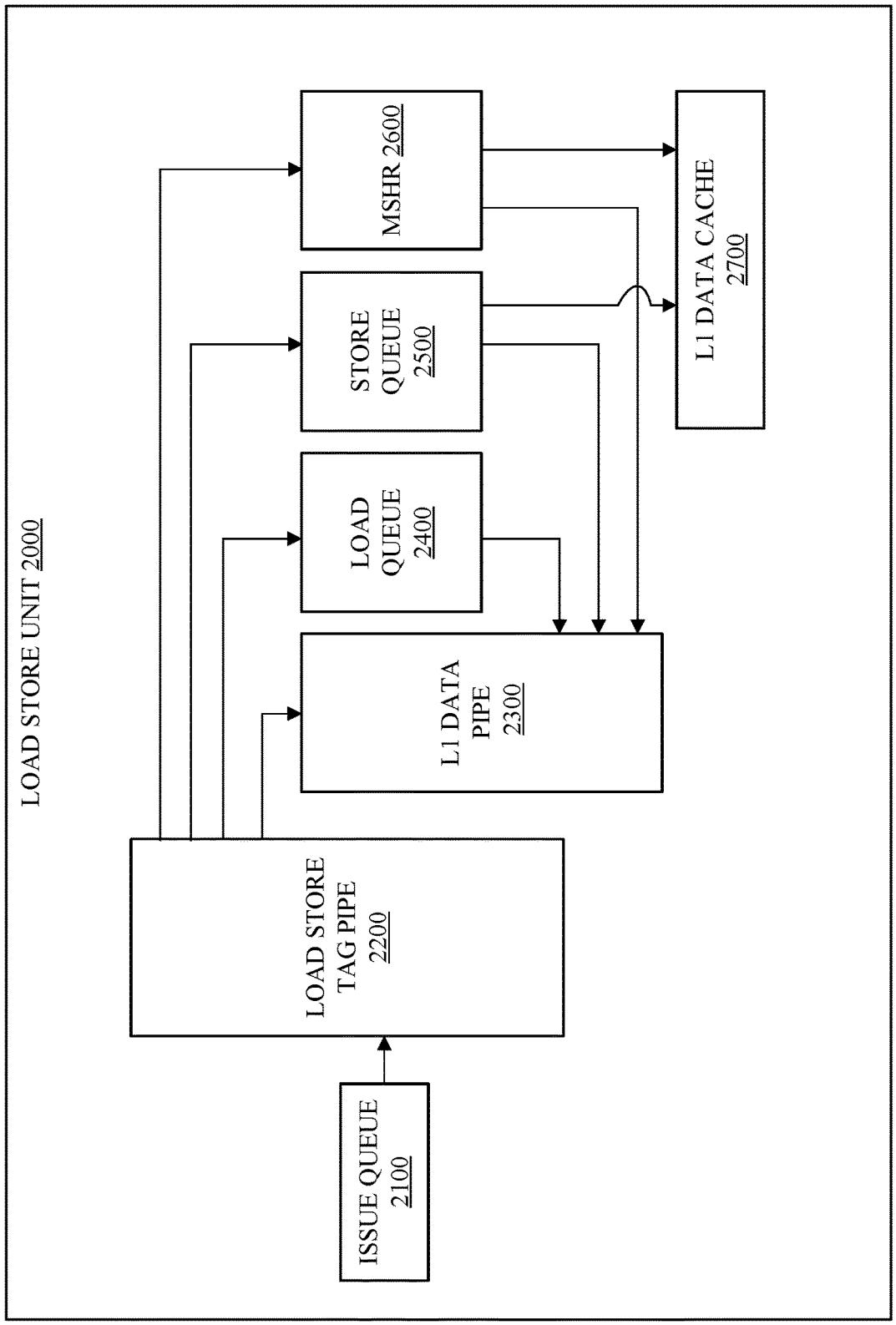
FIG. 2 is a high-level block diagram of an example load store unit of a processing system for implementing hybrid writebacks and writethroughs in accordance with embodiments of this disclosure.

FIG. 2 is a high-level block diagram of an example load/store unit 2000 of a processing system for implementing hybrid writebacks and writethroughs in accordance with embodiments of this disclosure. The load/store unit 2000 can include an issue queue 2100 which stores instructions dispatched from the dispatch/retire unit 1540 of FIG. 1. The issue queue 2100 can issue instructions into load/store tag pipes 2200, which can then allocate entries in a load/store data pipe 2300, a load queue 2400, a store queue 2500, and a missing status handling registers (MSHRs) 2600. Store instructions buffer data in the store queue 2500 until committed and then gather writes when retiring to a L1 data cache 2700 or the MSHR 2600.

The load/store unit 2000 and each element or component in the load/store unit 2000 is illustrative and can include additional, fewer or different devices, entities, element, components, and the like which can be similarly or differently architected without departing from the scope of the specification and claims herein. Moreover, the illustrated devices, entities, element, and components can perform other functions without departing from the scope of the specification and claims herein.

Figure 3:
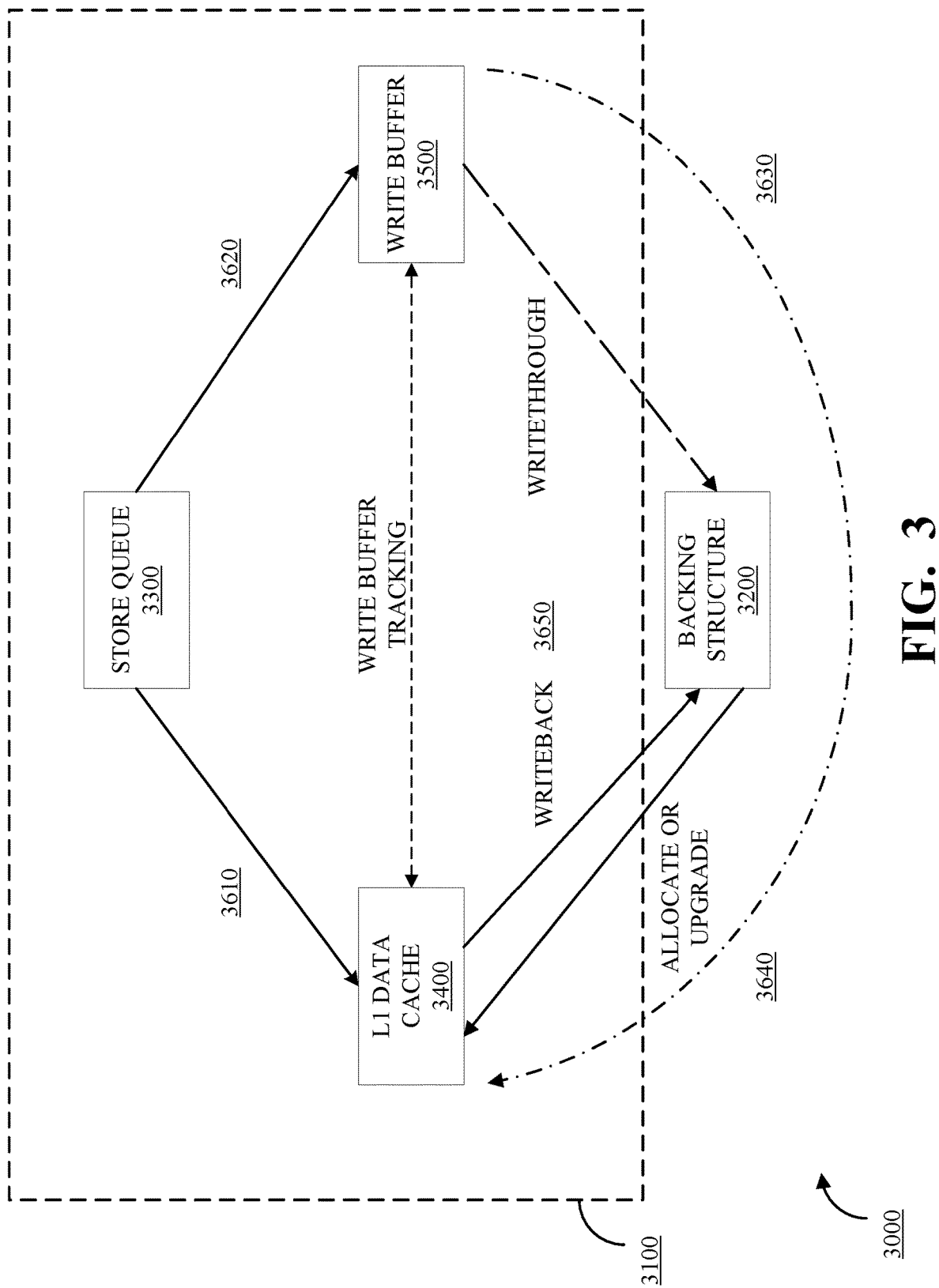
FIG. 3 is a flow diagram of an example technique or method for implementing hybrid writebacks and writethroughs in accordance with embodiments of this disclosure

FIG. 3 is a flow diagram 3000 of an example technique or method for implementing hybrid writebacks and writethroughs in accordance with embodiments of this disclosure. The flow diagram 3000 can be implemented, for example, in the processing system 1000 of FIG. 1, the load store unit 2000 of FIG. 2, and like devices and systems. The flow diagram 3000 describes communications or interactions with respect to a load/store unit 3100 and a backing structure 3200. In implementations, the backing structure 3200 can include a controller. The load/store unit 3100 can include a store queue 3300, a L1 data cache 3400, and a write buffer 3500. The L1 data cache 3400 an include a plurality of cache lines. The write buffer 3500 can track the coherence state of the L1 data cache 3400. In a starting state of the flow diagram 3000, a hit cache line of the L1 data cache 3400 can have a shared coherence state or an exclusive coherence state (collectively the "starting coherence state"). In implementations, the write buffer 3500 is a MSHR such as the MSHR 2600 of FIG. 2.

Upon dequeuing or retiring a queue entry, the store queue 3300 can write data to the hit cache line in the L1 data cache 3400 (3610) and allocate an entry in the write buffer 3500 (3620). As a result, the cache line in the L1 data cache 3400 is now in a starting coherence state with data and the allocated entry in the write buffer 3500 is now in a modified state with data. Since the write buffer 3500 tracks the L1 data cache 3400, the write buffer 3500 can send a message to the backing structure 3200 to upgrade the coherence state of the cache line in the L1 data cache 3400 (3630). The backing structure 3200 can the upgrade the cache line in the L1 data cache 3400 to a modified coherence state with data (3640). The write buffer 3500 can retire the data in the allocated entry upon upgrade confirmation of the cache line in the L1 data cache 3400. Consequently, the coherence state of the cache line in the L1 data cache 3400 is now in accordance with the coherence protocols. The L1 data cache 3400 can writeback the data in the cache line to the backing structure 3200 as appropriate (3650).

Figure 4:
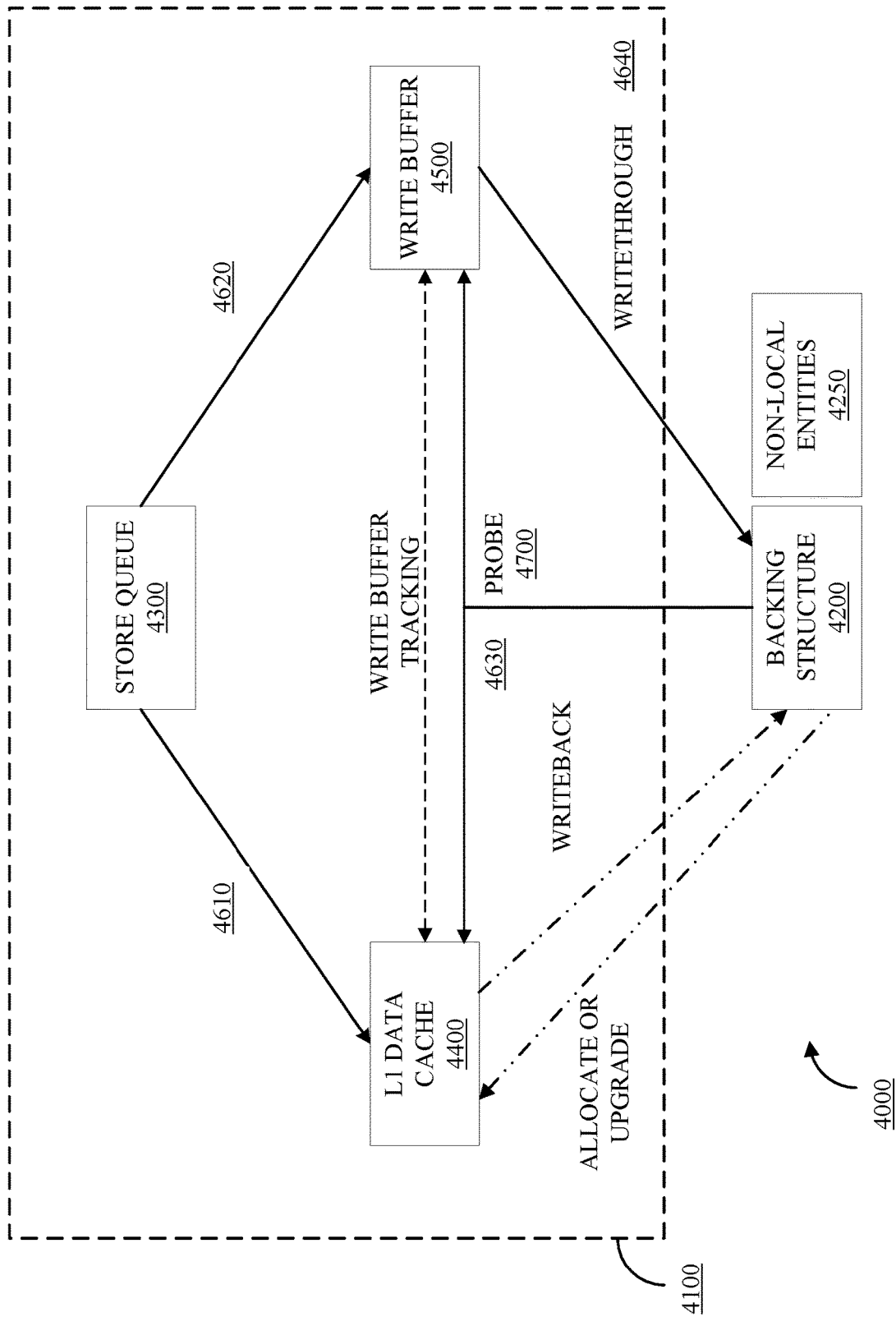
FIG. 4 is a flow diagram of an example technique or method for implementing hybrid writebacks and writethroughs in accordance with embodiments of this disclosure.

FIG. 4 is a flow diagram 4000 of an example technique or method for implementing hybrid writebacks and writethroughs in accordance with embodiments of this disclosure. The flow diagram 4000 can be implemented, for example, in the processing system 1000 of FIG. 1, the load store unit 2000 of FIG. 2, and like devices and systems. The flow diagram 4000 describes communications or interactions with respect to a load/store unit 4100 and a backing structure 4200, non-local entities 4250, or both. In implementations, the backing structure 4200 can include a controller. The load/store unit 4100 can include a store queue 4300, a L1 data cache 4400, and a write buffer 4500. The L1 data cache 4400 an include a plurality of cache lines. The write buffer 4500 can track the coherence state of the L1 data cache 4400. In a starting state of the flow diagram 4000, a hit cache line of the L1 data cache 4400 can have a shared coherence state or an exclusive coherence state (collectively the "starting coherence state"). In implementations, the write buffer 4500 is a MSHR such as the MSHR 2600 of FIG. 2.

Upon dequeuing or retiring a queue entry, the store queue 4300 can write data to the hit cache line of the L1 data cache 4400 (4610) and allocate an entry in the write buffer 4500 (4620). As a result, the cache line in the L1 data cache 4400 is now in a starting coherence state with data and the write buffer 4500 is now in a modified state with data. Prior to upgrading the cache line in the L1 data cache 4400, a probe 4700 is received from the backing structure 4200 or the non-local entities 4250 (4630). The probe 4700 can be a downgrade to a shared coherence state or a downgrade to an invalid shared coherence state. The probe 4700 can check against both the cache line in the L1 data cache 4400 and the allocated entry in the write buffer 4500.

In the case where the probe 4700 is a downgrade to a shared coherence state, the cache line in the L1 data cache 4400 remains valid in the current coherence state which is the shared coherence state with data. The write buffer 4500 is not in the correct coherence state, and writethroughs the data to the backing structure 4200 or the non-local entities 4250 (4640). Consequently, the coherence state of the cache line in the L1 data cache 4400 is now in accordance with the coherence protocols.

In the case where the probe 4700 is a downgrade to an invalid coherence state, the cache line in the L1 data cache 4400 is downgraded to an invalidate coherence state and the data in the cache line is discarded. The write buffer 4500 is downgraded to an invalidate coherence state and the write buffer 4500 writethroughs the data to the backing structure 4200 or the non-local entities 4250 (4640). Consequently, the coherence state of the cache line in the L1 data cache 3400 is now in accordance with the coherence protocols.

Figure 5:
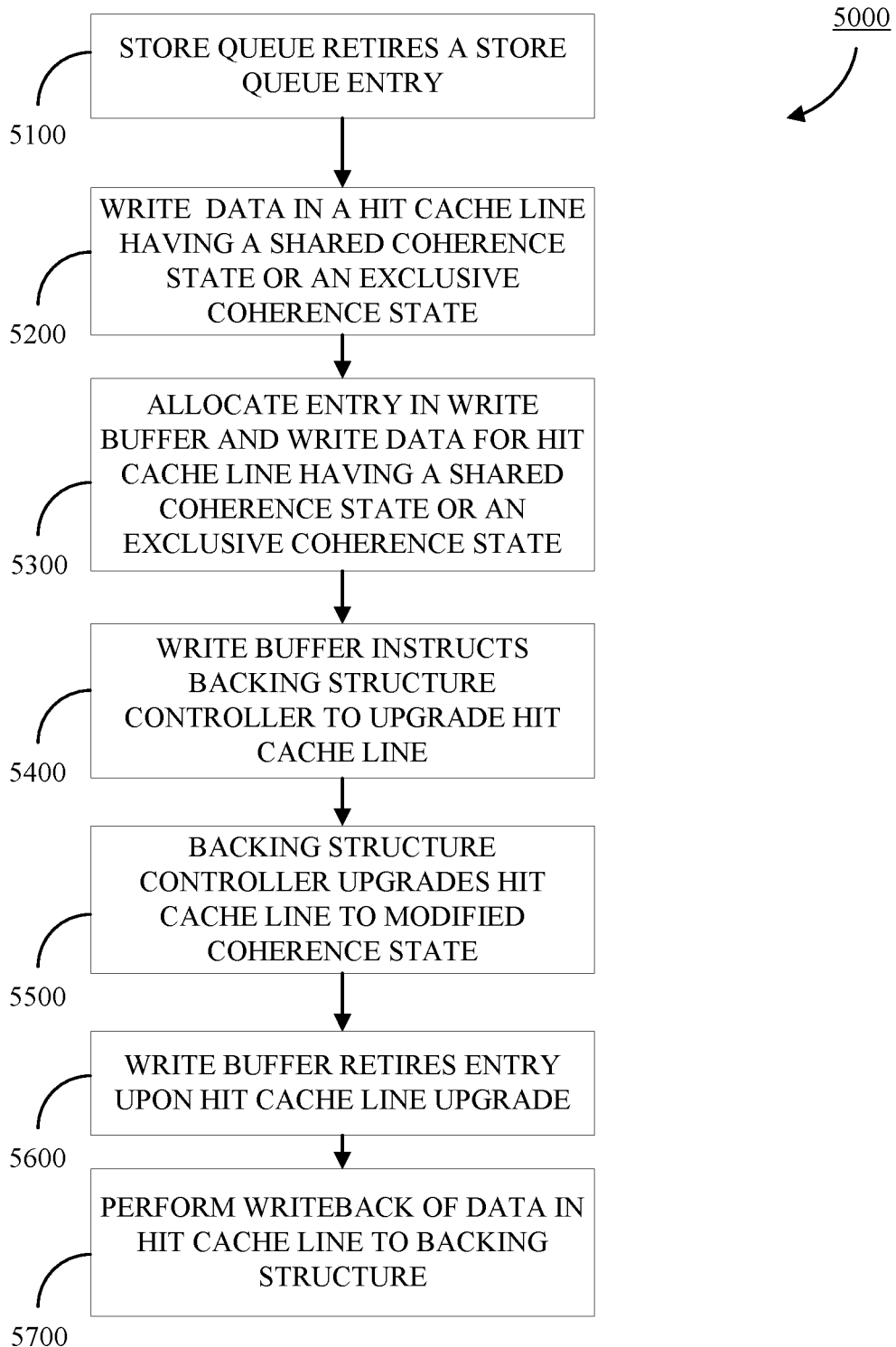
FIG. 5 is a diagram of an example technique for implementing hybrid writebacks and writethroughs in accordance with embodiments of this disclosure.

FIG. 5 is a diagram of an example technique 5000 for implementing hybrid writebacks and writethroughs in accordance with embodiments of this disclosure. The technique includes: retiring 5100 a store queue entry in the store queue; writing 5200 data for the retired store queue entry in a hit cache line having a shared coherence state or an exclusive coherence state; allocating 5300 an entry in a write buffer and writing the data for a hit cache line having a shared coherence state or an exclusive coherence state; instructing 5400 a backing structure controller to upgrade the hit cache line; upgrading 5500 the hit cache line to a modified coherence state; retiring 5600 the data in the write buffer upon confirmation of the hit cache line upgrade; and performing 5700 a writeback to a backing structure as appropriate. The technique 5000 can be implemented, for example, in the processing system 1000 of FIG. 1, the load store unit 2000 of FIG. 2, and like devices and systems.

The technique 5000 includes retiring 5100 a store queue entry in the store queue. A store queue retires data from a store queue entry upon commitment.

The technique 5000 includes writing 5200 data for the retired store queue entry in a hit cache line having a shared coherence state or an exclusive coherence state. Retired data is written to a data cache by the store queue and in particular, a cache line when there is hit with respect to a memory location or address even though the hit cache line is in a shared or exclusive coherence state. The hit cache line is now in a shared coherence state with data. In the event of a data cache miss, the data is written to a secondary cache or a backing store in a hierarchical memory structure.

The technique 5000 includes allocating 5300 an entry in a write buffer and writing the data for a hit cache line having a shared coherence state or an exclusive coherence state. In addition to writing the data to the hit cache line, the store queue allocates and writes the same data to a write buffer. In implementations, the write buffer is a MSHR. The write buffer is now in a modified coherence state with data.

The technique 5000 includes instructing 5400 a backing structure controller to upgrade the hit cache line. The write buffer can track the coherence state of the data cache. As a result, the write buffer can instruct a backing structure controller to upgrade the coherence state of the hit cache line to a modified coherence state with data.

The technique 5000 includes upgrading 5500 the hit cache line to a modified coherence state. In response to the write buffer, the backing structure controller upgrades the hit cache line to the modified coherence state with data.

The technique 5000 includes retiring 5600 the data in the write buffer upon confirmation of the hit cache line upgrade. The write buffer confirms the upgrade of the hit cache line and retires the data in the allocated entry.

The technique 5000 includes performing 5700 a writeback to a backing structure as appropriate. For a defined event, the data cache performs a writeback of the data in the hit cache line to the backing structure.

Figure 6:
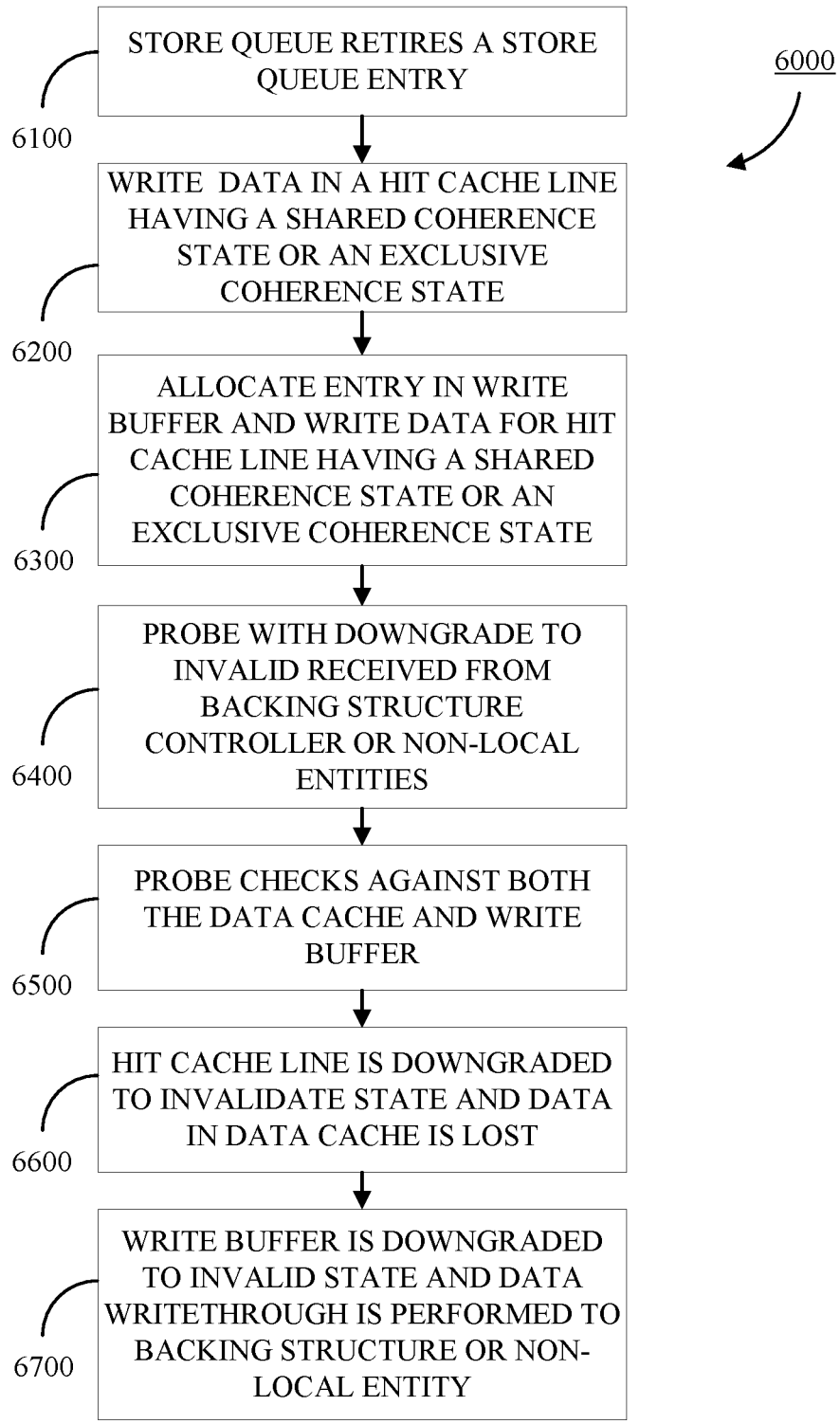
FIG. 6 is a diagram of an example technique for implementing hybrid writebacks and writethroughs in accordance with embodiments of this disclosure.

FIG. 6 is a diagram of an example technique 6000 for implementing hybrid writebacks and writethroughs in accordance with embodiments of this disclosure. The technique includes: retiring 6100 a store queue entry in the store queue; writing 6200 data for the retired store queue entry in a hit cache line having a shared coherence state or an exclusive coherence state; allocating 6300 an entry in a write buffer and writing the data for a hit cache line having a shared coherence state or an exclusive coherence state; receiving 6400 a probe with downgrade to invalid coherence state for the hit cache line from a backing structure controller or non-local entity; checking 6500 by the probe of the coherence states of the hit cache line and the allocated entry in the write buffer; downgrading 6600 the hit cache line to an invalid coherence state and discarding the data; and downgrading 6700 the allocated entry in the write buffer to an invalid coherence state and performing a writethrough of the data to the backing structure or non-local entity.

The technique 6000 includes retiring 6100 a store queue entry in the store queue. A store queue retires data from a store queue entry upon commitment.

The technique 6000 includes writing 6200 data for the retired store queue entry in a hit cache line having a shared coherence state or an exclusive coherence state. Retired data is written to a data cache by the store queue and in particular, a cache line when there is hit with respect to a memory location or address even though the hit cache line is in a shared or exclusive coherence state. The hit cache line is now in a shared coherence state with data. In the event of a data cache miss, the data is written to a secondary cache or a backing store in a hierarchical memory structure.

The technique 6000 includes allocating 6300 an entry in a write buffer and writing the data for a hit cache line having a shared coherence state or an exclusive coherence state. In addition to writing the data to the hit cache line, the store queue allocates and writes the same data to a write buffer. In implementations, the write buffer is a MSHR. The write buffer is now in a modified coherence state with data.

The technique 6000 includes receiving 6400 a probe with downgrade to invalid coherence state for the hit cache line from a backing structure controller or non-local entity. Prior to upgrading the coherence status of the hit cache line, writing the data to a backing structure, or both, a probe with downgrade to invalid coherence state for the hit cache line is received from a backing structure controller or non-local entity.

The technique 6000 includes checking 6500 by the probe of the coherence states of the hit cache line and the allocated entry in the write buffer. The probe causes the data cache and write buffer to downgrade the hit cache line and the allocated entry to an invalid coherence state.

The technique 6000 includes downgrading 6600 the hit cache line to an invalid coherence state and discarding the data. Upon downgrading, the data in the hit cache line is discarded.

The technique 6000 includes downgrading 6700 the allocated entry in the write buffer to an invalid coherence state and performing a writethrough of the data to the backing structure or non-local entity. Upon downgrading, the write buffer writethroughs the data to the backing store or non-local entity.

Figure 7:
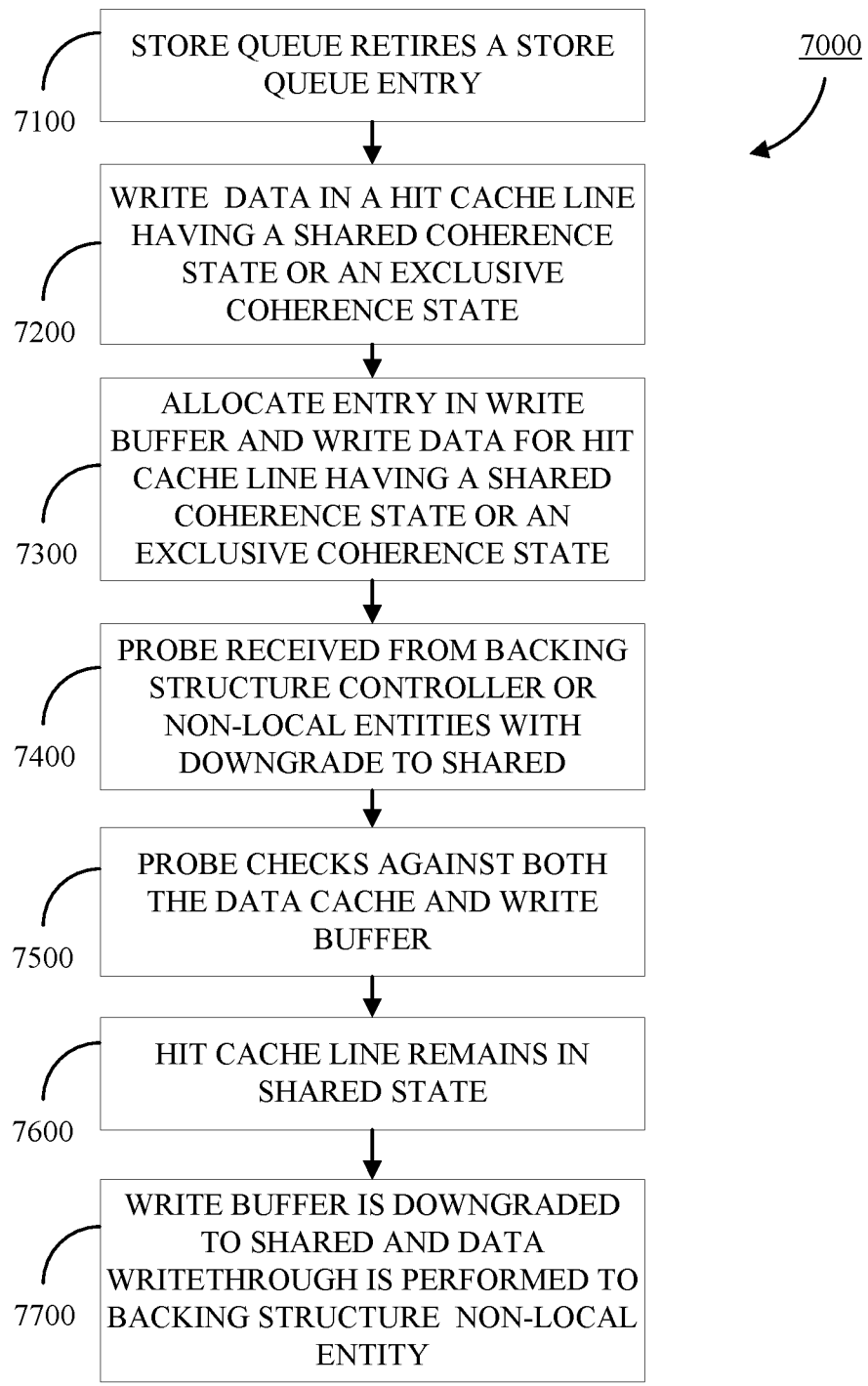
FIG. 7 is a diagram of an example technique for implementing hybrid writebacks and writethroughs in accordance with embodiments of this disclosure.

FIG. 7 is a diagram of an example technique 7000 for implementing hybrid writebacks and writethroughs in accordance with embodiments of this disclosure. The technique includes: retiring 7100 a store queue entry in the store queue; writing 7200 data for the retired store queue entry in a hit cache line having a shared coherence state or an exclusive coherence state; allocating 7300 an entry in a write buffer and writing the data for a hit cache line having a shared coherence state or an exclusive coherence state; receiving 7400 a probe with downgrade to shared coherence state for the hit cache line from a backing structure controller or non-local entity; checking 7500 by the probe of the coherence states of the hit cache line and the allocated entry in the write buffer; maintaining 7600 the hit cache line at the shared coherence state; and downgrading 7700 the allocated entry in the write buffer to a shared coherence state and performing a writethrough of the data to the backing structure or non-local entity.

The technique 7000 includes retiring 7100 a store queue entry in the store queue. A store queue retires data from a store queue entry upon commitment.

The technique 7000 includes writing 7200 data for the retired store queue entry in a hit cache line having a shared coherence state or an exclusive coherence state. Retired data is written to a data cache by the store queue and in particular, a cache line when there is hit with respect to a memory location or address even though the hit cache line is in a shared or exclusive coherence state. The hit cache line is now in a shared coherence state with data. In the event of a data cache miss, the data is written to a secondary cache or a backing store in a hierarchical memory structure.

The technique 7000 includes allocating 7300 an entry in a write buffer and writing the data for a hit cache line having a shared coherence state or an exclusive coherence state. In addition to writing the data to the hit cache line, the store queue allocates and writes the same data to a write buffer. In implementations, the write buffer is a MSHR. The write buffer is now in a modified coherence state with data.

The technique 7000 includes receiving 7400 a probe with downgrade to shared coherence state for the hit cache line from a backing structure controller or non-local entity. Prior to upgrading the coherence status of the hit cache line, writing the data to a backing structure, or both, a probe with downgrade to shared coherence state for the hit cache line is received from a backing structure controller or non-local entity.

The technique 7000 includes checking 7500 by the probe of the coherence states of the hit cache line and the allocated entry in the write buffer. The probe causes the data cache and write buffer to downgrade the hit cache line and the allocated entry to an invalid coherence state.

The technique 7000 includes maintaining 7600 the hit cache line at a shared coherence state.

The technique 7000 includes downgrading 7700 the allocated entry in the write buffer to a shared coherence state and performing a writethrough of the data to the backing structure or non-local entity. Upon downgrading, the write buffer writethroughs the data to the backing store or non-local entity.

In general, a processing system includes a memory and an associated memory controller; and a processor connected to the memory. The processor includes a data cache including a plurality of cache lines, a write buffer configured to track the data cache, a store queue configured to store one or more store operations, and write data to a hit cache line and an allocated entry in the write buffer when the hit cache line is initially in at least a shared coherence state, resulting in the hit cache line being in a shared coherence state with data and the allocated entry being in a modified coherence state with data. The write buffer configured to send a message to the memory controller to upgrade the hit cache line to a modified coherence state with data. The memory controller configured to upgrade the hit cache line to the modified coherence state with data. The write buffer configured to retire the data upon confirmation of the hit cache line upgrade. The data cache configured to perform a writeback of the data in the hit cache line to memory for a defined event. In implementations, the processor is configured to receive a downgrade to invalid coherence probe from one of an entity not local to the processor or the memory controller prior to upgrading the coherence state of the hit cache line, the data cache is configured to downgrade the hit cache line to an invalid coherence state and delete the data, and the write buffer is configured to downgrade the allocated entry to an invalid coherence state and perform a writethrough of the data to the memory. In implementations, the processor is configured to receive a downgrade to invalid coherence probe from one of an entity not local to the processor or the memory controller prior to writing the data to the memory, the data cache configured to downgrade the hit cache line to an invalid coherence state and delete the data, and the write buffer configured to downgrade the allocated entry to an invalid coherence state and perform a writethrough of the data to the memory. In implementations, the processor is configured to receive a downgrade to shared coherence probe from one of an entity not local to the processor or the memory controller prior to upgrading the coherence state of the hit cache line, the hit cache line configured to remain in the shared coherence state with data, and the write buffer configured to downgrade the allocated entry to the shared coherence state with data and perform a writethrough of the data to the memory. In implementations, the processor is configured to receive a downgrade to shared coherence probe from one of an entity not local to the processor or the memory controller prior to writing the data to the memory, the hit cache line configured to remain in the shared coherence state with data, and the write buffer configured to downgrade the allocated entry to the shared coherence state with data and perform a writethrough of the data to the memory. In implementations, the hit cache line is in an exclusive coherence state. In implementations, the write buffer is a miss status handling register. In implementations, entities or processes local to the processor can access the data stored in the hit cache line. In implementations, entities or processes local to the processor can read the data stored in the hit cache line. In implementations, the hit cache line in the modified coherence state with data is globally visible to entities or processes not local to the processor.

In general, a method for performing hybrid writeback and writethrough includes writing data from a retired store queue entry to a hit cache line in a data cache, wherein the hit cache line is initially in a shared coherence state, writing the data to an allocated entry in a write buffer when the hit cache line is in a shared coherence state, wherein the hit cache line is then in a shared coherence state with data and the allocated entry is in a modified coherence state with data, sending a message to a memory controller to upgrade the hit cache line to a modified coherence state with data, upgrading the hit cache line to the modified coherence state with data, retiring the data in the allocated entry upon confirmation of the hit cache line upgrade, an performing a writeback of the data in the hit cache line to memory for a defined event. In implementations, the method includes receiving a downgrade to invalid coherence probe from one of an entity not local to a processor associated with the data cache or the memory controller prior to one of upgrading the coherence state of the hit cache line or writing the data to the memory, downgrading the hit cache line to an invalid coherence state, deleting the data in hit cache line, downgrading the allocated entry to an invalid coherence state, and performing, by the write buffer, a writethrough of the data to the memory. In implementations, the method includes receiving a downgrade to shared coherence probe from one of an entity not local to a processor associated with the data cache or the memory controller prior to one of upgrading the coherence state of the hit cache line or writing the data to the memory, remaining, by the hit cache line, in the shared coherence state with data, downgrading the allocated entry to the shared coherence state with data, and performing, by the write buffer, a writethrough of the data to the memory. In implementations, the write buffer is a miss status handling register. In implementations, entities or processes local to the processor can access the data stored in the hit cache line. In implementations, the method includes tracking cache coherence states of the data cache by the write buffer.

In general, a method for performing hybrid writeback and writethrough includes writing data to a hit cache line in a data cache from a store queue, wherein the hit cache line is initially in a shared coherence state and after writing of the data the hit cache line is in a shared coherence state with data, writing the data to an allocated entry in a write buffer when the hit cache line is in a shared coherence state, wherein the allocated entry is in a modified coherence state with data after writing of the data, tracking cache coherence states of the data cache by the write buffer, prior to receiving a probe from a non-local entity: upgrading the hit cache line to the modified coherence state with data from a request by the write buffer based on tracked cache coherence states, retiring the data in the allocated entry upon confirmation of the hit cache line upgrade, and performing a writeback of the data in the hit cache line to memory for a defined event, and in the event of receiving a downgrade to invalid coherence probe from the non-local entity: downgrading the hit cache line to an invalid coherence state, deleting the data in hit cache line, downgrading the allocated entry to an invalid coherence state, and performing, by the write buffer, a writethrough of the data to the memory, and in the event of receiving a downgrade to shared coherence probe from the non-local entity: remaining, by the hit cache line, in the shared coherence state with data, downgrading the allocated entry to the shared coherence state with data, and performing, by the write buffer, a writethrough of the data to the memory. In implementations, the write buffer is a miss status handling register. In implementations, the method includes entities or processes local to the processor can access the data stored in the hit cache line. In implementations, the hit cache line in the modified coherence state with data is globally visible to entities or processes not local to the processor.

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more computer readable mediums having computer readable program code embodied thereon. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

While the disclosure has been described in connection with certain embodiments, it is to be understood that the disclosure is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. A processing system comprising:
   a backing structure including a controller; and
   a processor connected to the backing structure, the processor comprising:
      a data cache including a plurality of cache lines;
      a write buffer configured to track the data cache;
      a store queue configured to write data to a hit cache line and an allocated entry in the write buffer when the hit cache line is initially in a starting coherence state;
      the write buffer configured to retire the data upon confirmation by the controller of an upgrade of the hit cache line to a modified coherence state with data; and
      the data cache configured to perform a writeback of the data in the hit cache line to the backing structure for a defined event.

2. The processing system of claim 1, further comprising:
   the processor configured to receive a downgrade to invalid coherence probe from one of an entity not local to the processor or the controller prior to upgrading the coherence state of the hit cache line;
   the data cache configured to downgrade the hit cache line to an invalid coherence state and delete the data in response to the downgrade to invalid coherence probe; and
   the write buffer configured to downgrade the allocated entry to an invalid coherence state and perform a writethrough of the data to the backing structure.

3. The processing system of claim 1, further comprising:
   the processor configured to receive a downgrade to invalid coherence probe from one of an entity not local to the processor or the controller prior to writing the data to the backing structure;
   the data cache configured to downgrade the hit cache line to an invalid coherence state and delete the data; and
   the write buffer configured to downgrade the allocated entry to an invalid coherence state and perform a writethrough of the data to the backing structure.

4. The processing system of claim 1, further comprising:
   the processor configured to receive a downgrade to shared coherence probe from one of an entity not local to the processor or the controller prior to upgrading the coherence state of the hit cache line;
   the hit cache line configured to remain in the starting coherence state; and
   the write buffer configured to downgrade the allocated entry to a shared coherence state with data and perform a writethrough of the data to the backing structure.

5. The processing system of claim 1, further comprising:
   the processor configured to receive a downgrade to shared coherence probe from one of an entity not local to the processor or the controller prior to writing the data to the backing structure;
   the hit cache line configured to remain in the starting coherence state; and
   the write buffer configured to downgrade the allocated entry to the shared coherence state with data and perform a writethrough of the data to the backing structure.

6. The processing system of claim 1, wherein the starting coherence state is one of a shared coherence state or an exclusive coherence state.

7. The processing system of claim 1, wherein the write buffer is a miss status handling register.

8. The processing system of claim 1, wherein entities or processes local to the processor can access the data stored in the hit cache line.

9. The processing system of claim 1, wherein entities or processes local to the processor can read the data stored in the hit cache line.

10. The processing system of claim 1, wherein the hit cache line in the modified coherence state with data is globally visible to entities or processes not local to the processor.

11. A method for performing hybrid writeback and writethrough, the method comprising:
   writing data from a retired store queue entry to a hit cache line in a data cache, wherein the hit cache line is initially in a starting coherence state;
   writing the data to an allocated entry in a write buffer when the hit cache line is in the starting coherence state;
   retiring the data upon confirmation by a backing structure controller of upgrading the hit cache line to a modified coherence state with data; and
   performing a writeback of the data in the hit cache line to a backing structure for a defined event.

12. The method of claim 11, further comprising:
   receiving a downgrade to invalid coherence probe from one of an entity not local to a processor associated with the data cache or the backing structure controller prior to one of upgrading the coherence state of the hit cache line or writing the data to the backing structure;
   downgrading the hit cache line to an invalid coherence state;
   deleting the data in hit cache line;
   downgrading the allocated entry to an invalid coherence state; and
   performing, by the write buffer, a writethrough of the data to the backing structure.

13. The method of claim 11, further comprising:
   receiving a downgrade to shared coherence probe from one of an entity not local to a processor associated with the data cache or the backing structure controller prior to one of upgrading the coherence state of the hit cache line or writing the data to the backing structure;
   remaining, by the hit cache line, in the starting coherence state;
   downgrading the allocated entry to a shared coherence state with data; and performing, by the write buffer, a writethrough of the data to the backing structure.

14. The method of claim 11, wherein the starting coherence state is one of a shared coherence state or an exclusive coherence state.

15. The method of claim 11, wherein entities or processes local to the processor can access the data stored in the hit cache line.

16. The method of claim 11, further comprising:
tracking cache coherence states of the data cache by the write buffer.

17. A method for performing hybrid writeback and writethrough, the method comprising:
writing data to a hit cache line in a data cache from a store queue, wherein the hit cache line is initially in a starting coherence state;
writing the data to an allocated entry in a write buffer when the hit cache line is in the starting coherence state, wherein the allocated entry is in a modified coherence state with data after writing of the data;
tracking cache coherence states of the data cache by the write buffer;
prior to receiving a probe from a non-local entity:
retiring the data in the allocated entry upon confirmation of an upgrade of the hit cache line to the modified coherence state with data based on tracked cache coherence states; and
performing a writeback of the data in the hit cache line to memory for a defined event.

18. The method of claim 17, the method further comprising:
responsive to receiving a downgrade to invalid coherence probe from the non-local entity:
downgrading the hit cache line to an invalid coherence state;
deleting the data in hit cache line;
downgrading the allocated entry to an invalid coherence state; and
performing, by the write buffer, a writethrough of the data to the memory.

19. The method of claim 17, the method further comprising:
responsive to receiving a downgrade to shared coherence probe from the non-local entity:
remaining, by the hit cache line, in the starting coherence state;
downgrading the allocated entry to the shared coherence state with data; and
performing, by the write buffer, a writethrough of the data to the memory.

20. The method of claim 17, wherein the starting coherence state is one of a shared coherence state or an exclusive coherence state.

* * * * *